(12) United States Patent
Yanagida et al.

(10) Patent No.: US 10,847,953 B2
(45) Date of Patent: Nov. 24, 2020

(54) CONNECTION STRUCTURE FOR EXTERNAL CONNECTION BUS BAR AND CONNECTION METHOD FOR EXTERNAL CONNECTION BUS BAR

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); TOYOTA JIDOSHA KABUSHIKI KAISHA, Aichi-ken (JP)

(72) Inventors: Taiji Yanagida, Mie (JP); Yoshiaki Kuroyanagi, Mie (JP); Koichi Tanaka, Aichi-ken (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 214 days.

(21) Appl. No.: 16/241,272

(22) Filed: Jan. 7, 2019

(65) Prior Publication Data
US 2019/0222003 A1    Jul. 18, 2019

(30) Foreign Application Priority Data
Jan. 16, 2018 (JP) .................................. 2018-004941

(51) Int. Cl.
*H02G 3/08* (2006.01)
*H02G 5/00* (2006.01)
(Continued)

(52) U.S. Cl.
CPC .............. *H02B 1/21* (2013.01); *H01M 2/202* (2013.01); *H01R 11/282* (2013.01); *H01R 11/288* (2013.01)

(58) Field of Classification Search
CPC ...... H01M 2/1077; H01M 2/20; H01M 2/202; H01M 2/206; H01M 2/22; H01M 2/305;
(Continued)

(56) References Cited

U.S. PATENT DOCUMENTS 7,893,364 B2 * 2/2011 Oda ....................... H05K 7/026
174/520
10,014,675 B2 * 7/2018 Kobayashi ........... H05K 5/0069
(Continued)

FOREIGN PATENT DOCUMENTS

JP      2013-157122      8/2013

*Primary Examiner* — Angel R Estrada
(74) *Attorney, Agent, or Firm* — Greenblum & Bernstein, P.L.C.

(57) ABSTRACT

A connection structure for an external connection bus bar configured to connect the external connection bus bar to an external connection electrode terminal of a power storage element stack including power storage elements including electrode terminals. The connection structure includes: the external connection bus bar including one end part to be connected to the external connection electrode terminal; a receiving connector that houses the external connection bus bar and is fixed to the power storage element stack, and that includes a connector terminal to be connected to the external connection bus bar and to connect the external connection bus bar to an outside; and a fixing member that is provided to one end of the power storage element stack and fixes the receiving connector. The external connection bus bar includes a flexible part that is configured to expand and contract in a direction where the power storage elements are arranged.

6 Claims, 12 Drawing Sheets

(51) Int. Cl.
*H01M 2/20* (2006.01)
*H02B 1/21* (2006.01)
*H01R 11/28* (2006.01)

(58) Field of Classification Search
CPC . H01M 2/347; H01M 2220/20; H01R 11/288;
H01R 11/282; Y02E 60/10; H02B 1/21;
H02B 1/26; H02G 3/08; H02G 3/081;
H05K 5/00; H05K 5/02
USPC ........ 174/68.2, 50, 520, 72 B; 320/107, 112;
439/76.1, 76.2
See application file for complete search history.

(56) References Cited

U.S. PATENT DOCUMENTS

| | | | |
|---|---|---|---|
| 10,629,873 B2* | 4/2020 | Sato | ............... H01M 2/202 |
| 2013/0196533 A1 | 8/2013 | Ogasawara et al. | |

* cited by examiner

CONNECTION STRUCTURE FOR EXTERNAL CONNECTION BUS BAR AND CONNECTION METHOD FOR EXTERNAL CONNECTION BUS BAR

CROSS REFERENCE TO RELATED APPLICATION

This application claims priority from Japanese Patent Application No. 2018-004941 filed on Jan. 16, 2018. The entire contents of the priority application are incorporated herein by reference.

TECHNICAL FIELD

The technology described herein relates to a connection structure for an external connection bus bar and a connection method for an external connection bus bar, and specifically to a connection structure and a connection method for an external connection bus bar that is connected to an electrode terminal for external connection of a power storage element stack.

BACKGROUND

In a power storage module for a vehicle such as an electric vehicle or a hybrid vehicle, a plurality of power storage elements including electrode terminals of a positive electrode and a negative electrode are arranged to form a power storage element stack. In this case, in order to connect the power storage element stack to an external device or connect the power storage element stack to another power storage element stack, an external connection electrode terminal is connected to the electrode terminal of the power storage element. A technology related to such an external connection electrode terminal is disclosed in Japanese Unexamined Patent Application Publication No. 2013-157122. According to the disclosure in Japanese Unexamined Patent Application Publication No. 2013-157122, when the power storage element stack is connected to another power storage element stack, crimp terminals are provided at both ends of a high-voltage cable, and each crimp terminal is fastened using a bolt to the electrode terminal of the power storage element at an end of each power storage element stack with a nut.

In Japanese Unexamined Patent Application Publication No. 2013-157122, two power storage element stacks can be connected with a simple structure; however, in a case where the power storage element stack is mounted on a vehicle, vibration from the vehicle is applied to a connection part between the crimp terminal and the electrode terminal that are fastened using a bolt. In this case, the vibration applied from the vehicle may be amplified by a high-voltage cable. Thus, the vibration from the vehicle that is applied to the connection part between the crimp terminal and the electrode terminal may loosen the nut, and this may result in lower reliability. In view of this, a connection structure to connect between the external connection bus bar and the external connection electrode terminal of the power storage element that can maintain the reliability of the connection has been desired.

SUMMARY

The technology described herein was made in view of the above circumstances. An object is to provide a connection structure for an external connection bus bar that can increase the reliability of the connection between the external connection bus bar and the external connection electrode terminal of the power storage element.

A connection structure for an external connection bus bar according to the technology described herein is a connection structure for an external connection bus bar configured to connect the external connection bus bar to an external connection electrode terminal of a power storage element stack formed by arranging a plurality of power storage elements including electrode terminals of a positive electrode and a negative electrode. The connection structure includes: the external connection bus bar including one end part to be connected to the external connection electrode terminal; a receiving connector that houses the external connection bus bar and is fixed to the power storage element stack, and that includes a connector terminal to be connected to the external connection bus bar and to connect the external connection bus bar to an outside; and a fixing member that is provided to one end of the power storage element stack and fixes the receiving connector. The external connection bus bar includes a flexible part that is configured to expand and contract in a direction where the power storage elements are arranged.

In the present configuration, the external connection bus bar is connected to an external connection member through the connector terminal of the receiving connector that is fixed to the fixing member. Therefore, as compared to a case in which the external connection member is directly connected to the external connection bus bar, a part of the vibration from a vehicle that is applied to a connection part between the external connection bus bar and the external connection electrode terminal is absorbed in the receiving connector, and thus, the vibration from the vehicle is reduced.

In addition, when the receiving connector is fixed to the fixing member, the tolerance between the power storage element and the fixing member that is caused by the product tolerance of the power storage element can be absorbed by the flexible part of the external connection bus bar. Accordingly, the stress is applied less to the connection part. By reducing the vibration from the vehicle and the stress on the connection part between the external connection bus bar and the external connection electrode terminal in this manner, the reliability of the connection between the external connection bus bar and the external connection electrode terminal of the power storage element can be increased.

In the connection structure for the external connection bus bar, the external connection electrode terminal may include a bolt terminal. The external connection bus bar may include an insertion hole at the one end part, the insertion hole into which the bolt terminal is inserted. The insertion hole may have an oval shape that is long in the direction where the power storage elements are arranged.

In the present configuration in which the external connection bus bar is connected by bolt fastening to the external connection electrode terminal, the reliability of the connection between the external connection bus bar and the external connection electrode terminal of the power storage element against the vibration from the vehicle can be increased. Here, since the insertion hole has the oval shape, the product tolerance of the power storage elements and the like in the direction where the power storage elements are arranged can be absorbed when the external connection bus bar is connected to the external connection electrode terminal of the power storage element.

In the connection structure for the external connection bus bar, the fixing member may include a fixing hole configured to fix the receiving connector. The receiving connector may include a penetration hole communicating with the fixing hole, the penetration hole allowing a bolt that is to be fitted to the fixing hole to pass therethrough. The penetration hole may be larger in diameter than the fixing hole.

In the present configuration, the penetration hole for the bolt may be larger in diameter than the fixing hole. Therefore, when the receiving connector is fixed to the fixing member with the bolt, the fixing position can be set flexibly. Thus, for example, backlash of the receiving connector that is due to the product tolerance in fixing the receiving connector can be absorbed.

The connection structure for the external connection bus bar may include an external connection bus bar protector that holds the one end part of the external connection bus bar. The external connection bus bar protector may include a first positioning part that positions the external connection bus bar in a vertical direction, and a second positioning part that positions the external connection bus bar in a width direction.

In the present configuration, one end part of the external connection bus bar can be fixed to a predetermined position with the first positioning part and the second positioning part. Therefore, the external connection bus bar can be connected to the external connection electrode terminal of the power storage element more stably. This also contributes to the higher reliability in connecting between the external connection bus bar and the external connection electrode terminal of the power storage element.

A connection method for an external connection bus bar according to the technology described herein is a connection method for an external connection bus bar configured to connect the external connection bus bar to an external connection electrode terminal of a power storage element stack formed by arranging a plurality of power storage elements including electrode terminals of a positive electrode and a negative electrode. The connection method includes: preparing the external connection bus bar that includes one end part to be connected to the external connection electrode terminal and includes a flexible part that is configured to expand and contract in a direction where the power storage elements are arranged, and a receiving connector that houses the external connection bus bar and is fixed to the power storage element stack and that includes a connector terminal to be connected to the external connection bus bar and to connect the external connection bus bar to an outside; a bus bar connecting step of connecting the external connection bus bar to the external connection electrode terminal in a state where the external connection bus bar is housed in the receiving connector; and a connector fixing step of fixing the receiving connector to the power storage element stack by using expansion and contraction of the flexible part.

In the present connection method, the external connection bus bar is connected to the outside, such as a connection cable, through the connector terminal of the receiving connector that is fixed to the fixing member. Therefore, as compared to a case in which the connection cable is directly connected to the external connection bus bar, a part of vibration from the vehicle that is applied to the connection part between the external connection bus bar and the external connection electrode terminal is absorbed by the receiving connector, and thus, the vibration from the vehicle is reduced.

In addition, when the receiving connector is fixed to the fixing member, the tolerance between the power storage element and the fixing member that is caused by the product tolerance of the power storage element can be absorbed by the flexible part of the external connection bus bar. Accordingly, the stress is applied less to the connection part. By reducing the vibration from the vehicle and the stress on the connection part between the external connection bus bar and the external connection electrode terminal in this manner, the reliability of the connection between the external connection bus bar and the external connection electrode terminal of the power storage element can be increased.

The connection method for the external connection bus bar may further include preparing an external connection bus bar protector that holds the one end part of the external connection bus bar and includes a positioning part that positions the external connection bus bar. The bus bar connecting step may further include: a connector temporarily fixing step of causing the external connection bus bar protector to hold the one end part of the external connection bus bar and temporarily fixing the receiving connector to the fixing member of the power storage element stack to temporarily position the receiving connector in the direction where the power storage elements are arranged; a bus bar positioning step of positioning the one end part of the external connection bus bar in a width direction and a vertical direction using the positioning part; and a bus bar connecting step of connecting the one end part of the external connection bus bar to the external connection electrode terminal. The connector fixing step may further include a connector positioning step of, when the receiving connector is fixed to the fixing member, positioning the receiving connector in the direction where the power storage elements are arranged by using the expansion and contraction of the flexible part of the external connection bus bar.

In the present connection method, while the receiving connector is temporarily fixed, the external connection bus bar is positioned and connected to the external connection electrode terminal. Therefore, the external connection bus bar and the external connection electrode terminal can be connected correctly at a predetermined place. In addition, the receiving connector can be fixed at a desired position while the backlash due to the product tolerance is absorbed using the expansion and contraction of the flexible part of the external connection bus bar.

With the connection structure for an external connection bus bar according to the technology described herein, the reliability of the connection between the external connection bus bar and the external connection electrode terminal of the power storage element can be increased.

DETAILED DESCRIPTION

Embodiment

One embodiment of the technology described herein is described with reference to FIG. 1 to FIG. 12.

Figure 1:
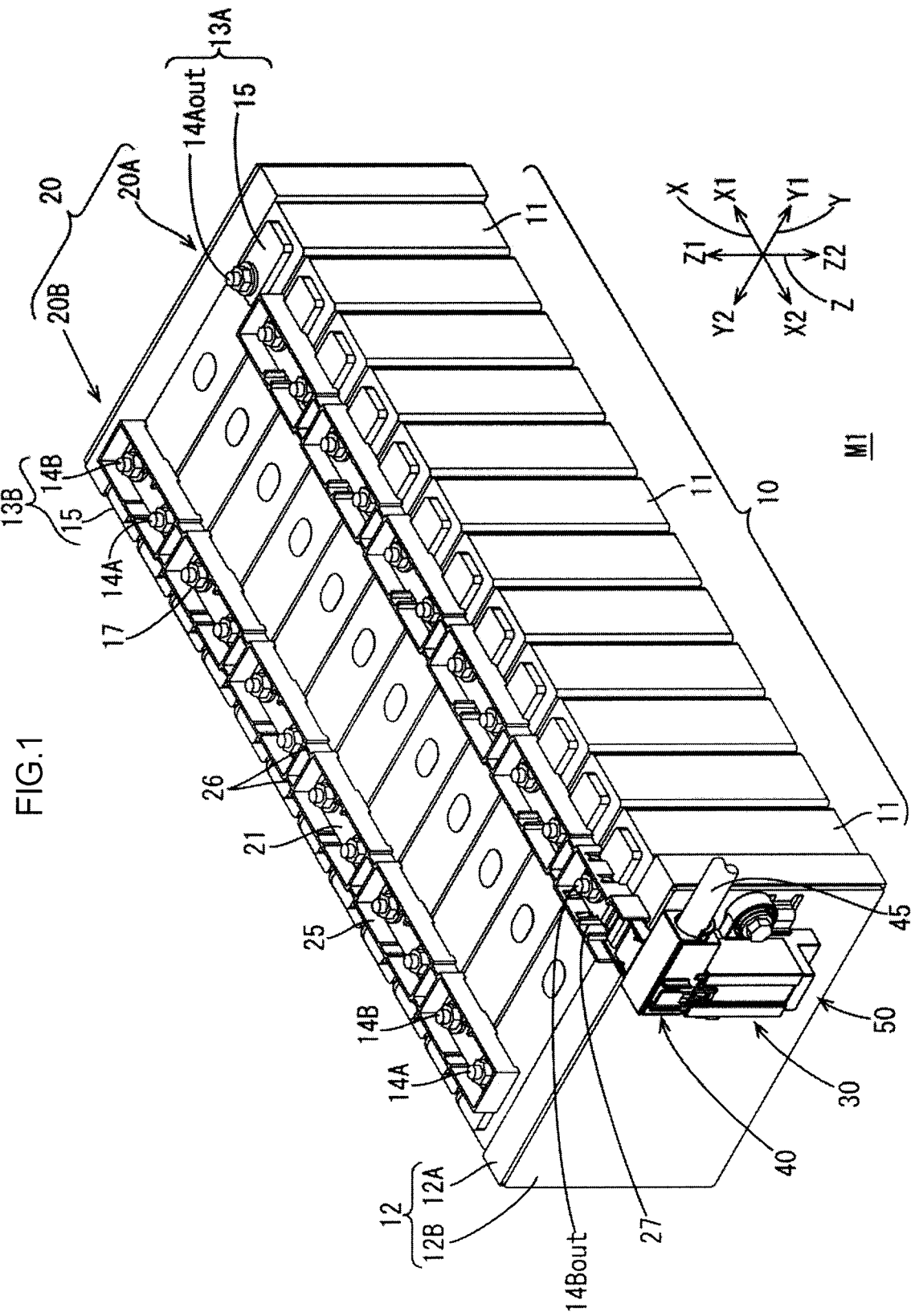
FIG. 1 is a schematic perspective view of a power storage module according to one embodiment.

As illustrated in FIG. 1, a power storage module M1 includes a power storage element stack 10 in which a plurality of power storage elements 11 are arranged, a stack fixing member 12, a connection module 20, an external connection receiving connector 30, and a connection structure 50 for an external connection bus bar.

The power storage module M1 is used for, for example, a driving source of a vehicle such as an electric vehicle or a hybrid vehicle. In the description below, a plurality of members that is the same may be denoted by one reference sign and the reference signs and description of the other members may be omitted.

1. Power Storage Element Stack

The power storage element stack 10 to which the connection module 20 according to the present embodiment is attached is formed by arranging a plurality of (twelve in the present embodiment) power storage elements 11 as illustrated in FIG. 1.

The power storage element 11 includes an electrode terminal part 13A of a positive electrode and an electrode terminal part 13B of a negative electrode that project vertically from an upper surface of a main body part with a flat rectangular parallelepiped shape in which a power storage component that is not shown is housed.

Each electrode terminal part 13 (13A, 13B) includes a terminal board 15 with a plate-like shape, and an electrode terminal 14 (14A, 14B) with a cylindrical shape that projects upward from the terminal board 15. Each electrode terminal 14 is inserted into a terminal insertion hole 22 of a bus bar 21 (see FIG. 11). To a side wall part of the electrode terminal 14, a screw thread (not shown) to which a nut 17 is fitted is formed. That is to say, the electrode terminal 14 is a bolt terminal in the present embodiment.

The positive electrode terminal 14A on the front side (arrow-Y1 side) of the power storage element 11 that is on a right end (end on arrow-X1 side) in FIG. 1 corresponds to an external connection positive electrode terminal (external connection electrode terminal) 14Aout, and the negative electrode terminal 14B on the front side (arrow-Y1 side) of the power storage element 11 that is on a left end (end on arrow-X2 side) in FIG. 1 corresponds to an external connection negative electrode terminal (external connection electrode terminal) 14Bout. In the description below, the positive electrode terminal 14A and the negative electrode terminal 14B are simply referred to as the electrode terminal 14 unless they need to be distinguished.

When the bus bar 21 inserted to the electrode terminal 14 and the terminal board 15 are in contact with each other, the bus bar 21 and the electrode terminal 14 are in electric connection. A plurality of the power storage elements 11 is disposed such that the electrode terminals 14 that are adjacent in the left-right direction (arrow-X direction) in FIG. 1 have opposite polarities.

Outside the power storage elements 11 at both ends of the power storage element stack 10, a stack fixing member (one example of fixing member) 12 is provided to fix the power storage element stack 10. The stack fixing member 12 includes, for example, a first fixing member 12A formed of a strong and thick metal plate, and a second fixing member 12B formed of a thin insulating material and covering the first fixing member 12A.

The stack fixing member 12 is also used to fix the external connection receiving connector 30 to be described below. Therefore, the first fixing member 12A and the second fixing member 12B include a pair of screw holes (one example of fixing holes) 18 for fastening the external connection receiving connector 30 with a bolt. In addition, the second fixing member 12B includes a pair of engaging pieces 19 for engaging with and fixing the external connection receiving connector 30 (see FIG. 9 and FIG. 10).

Although not shown, the power storage element stack 10 together with the stack fixing member 12 are fastened and fixed by a fastening band that is provided in the periphery, for example. Note that the configuration of the stack fixing member 12 is not limited to the above structure. For example, the first fixing member 12A and the second fixing member 12B may be formed by one fixing member.

2. Connection Module

The connection module 20 is attached to the power storage element stack 10 along a direction (arrow-X direction) where the power storage elements 11 are arranged, and has a function of electrically connecting the plurality of power storage elements 11 as illustrated in FIG. 1. The connection module 20 includes a first bus bar module 20A and a second bus bar module 20B.

Each bus bar module (20A, 20B) includes a plurality of bus bars 21, a plurality of protectors 25 that holds the bus bars 21 in an insulated state, and linking parts 26 that link the protectors 25 as illustrated in FIG. 1.

On an upper surface of the plurality of power storage elements 11, the first bus bar module 20A is attached at one end part (end part in arrow-Y1 direction in FIG. 1) in a direction (arrow-Y direction in FIG. 1) that is perpendicular to the direction where the plurality of power storage elements 11 is arranged as illustrated in FIG. 1. On the other hand, on the upper surface of the plurality of power storage elements 11, the second bus bar module 20B is attached to the other end part (end part in arrow-Y2 direction in FIG. 1) that is opposite to the one end part as illustrated in FIG. 1.

Note that the first bus bar module 20A and the second bus bar module 20B are different only in their both end parts. That is to say, at a left end of the first bus bar module 20A (end part in arrow-X2 direction in FIG. 1), an external connection bus bar protector 27 for an external connection bus bar 32 to be described below is provided.

Figure 2:
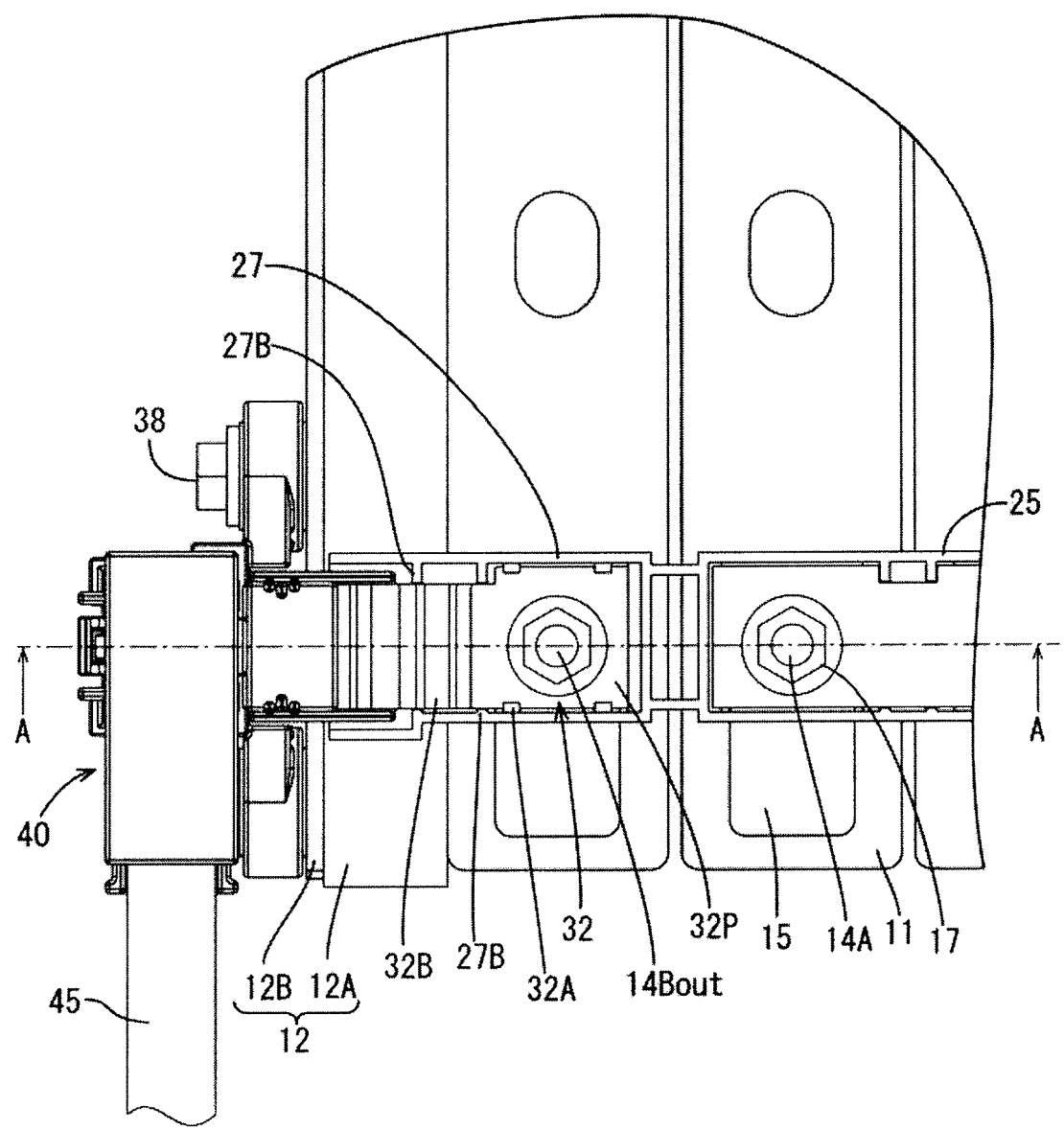
FIG. 2 is a partial plan view illustrating an external connection part of a power storage module.

On each of opposite wall parts of the external connection bus bar protectors 27, two positioning claws 27A (one example of first positioning part) with flexibility are provided, which are therefore provided four in total to the wall parts, in order to position the external connection bus bar 32 in a vertical direction (arrow-Z direction in FIG. 1) as illustrated in FIG. 2. On each of the same wall parts, two positioning ribs 27B (one example of second positioning part) are provided, which are therefore provided four in total to the wall parts, in order to position the external connection bus bar 32 in a width direction (arrow-Y direction in FIG. 1) as illustrated in FIG. 2.

With these positioning claws 27A and positioning ribs 27B, a flat plate part (one end part) 32P of the external connection bus bar can be fixed to a predetermined position. Therefore, the external connection bus bar 32 can be connected to the external connection negative electrode terminal 14Bout more stably. This also contributes to the higher reliability in connecting between the external connection bus bar 32 and the external connection negative electrode terminal 14Bout. The configuration of the first positioning part is not limited to the positioning claw 27A and the configuration of the second positioning part is not limited to the positioning rib 27B.

The bus bar 21 connects between the positive electrode terminal 14A and the negative electrode terminal 14B of the adjacent power storage elements 11. The bus bar 21 is formed of metal such as copper, copper alloy, stainless steel (SUS), or aluminum, and a pair of terminal insertion holes 22 (see FIG. 11) into which the electrode terminal 14 is inserted is formed to penetrate.

3. External Connection Receiving Connector

Figure 4:
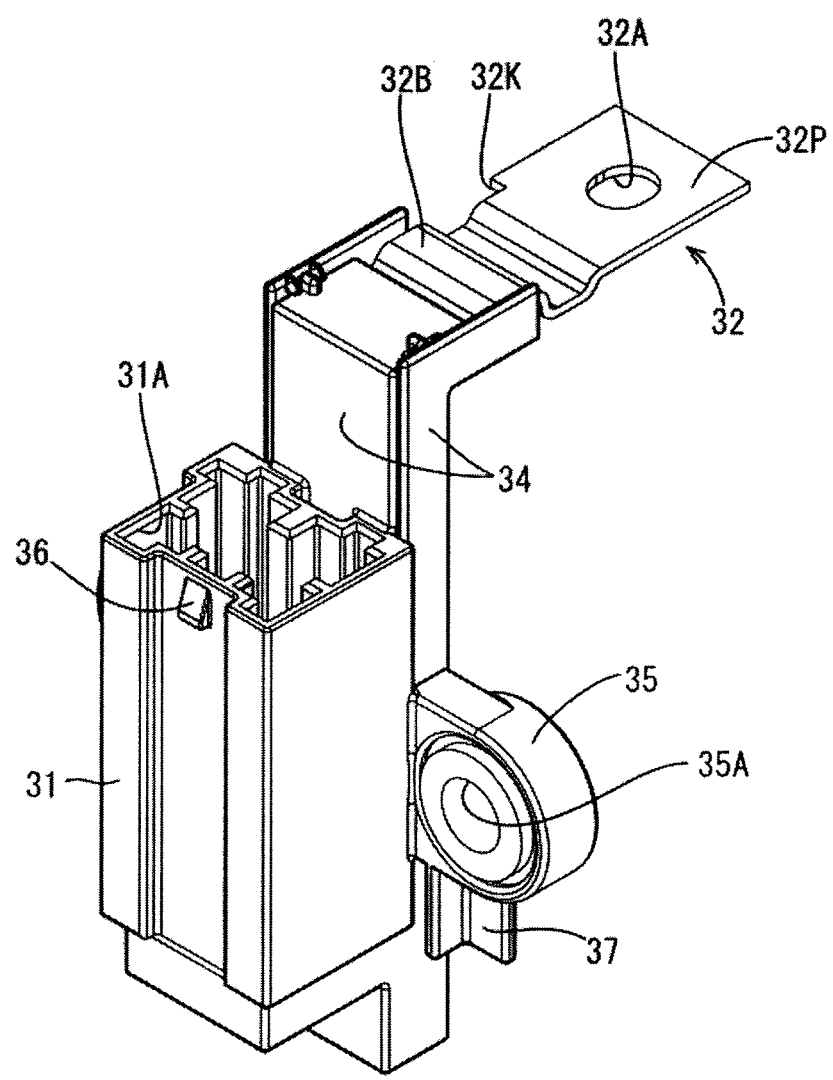
FIG. 4 is a perspective view of a receiving connector.
Figure 5:
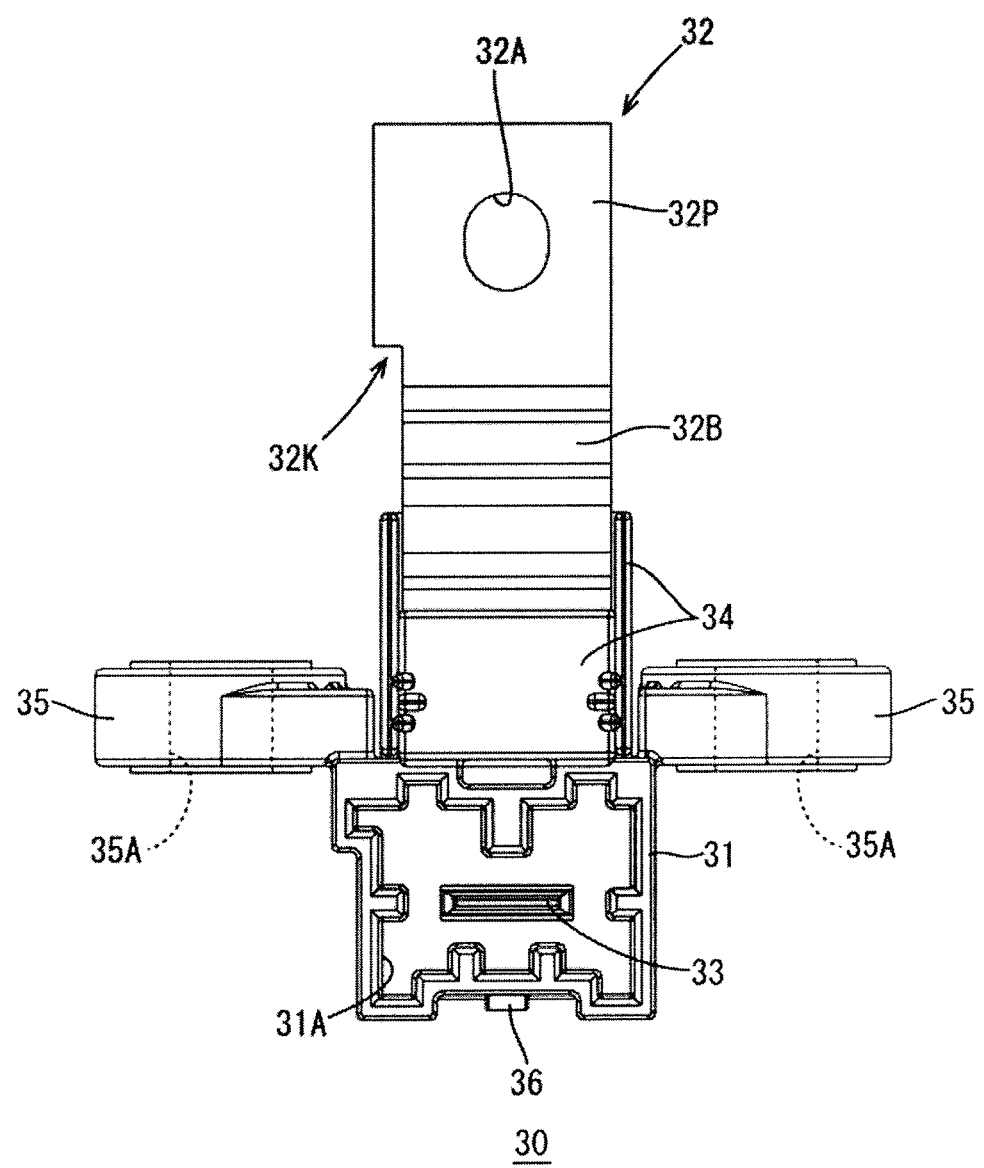
FIG. 5 is a plan view of the receiving connector.

The external connection receiving connector (hereinafter simply referred to as "receiving connector") 30 is a male connector, and includes a connector housing 31, the external connection bus bar 32, a male connector terminal 33, a bus bar holding part 34, a fixing part 35, an engaging claw 36, an engaging part 37, and the like as illustrated in FIG. 4 and FIG. 5.

The connector housing 31 includes a housing part 21A. In the housing part 21A, the male connector terminal 33 is provided (see FIG. 7), and a female connector 40 is inserted into the housing part 21A (see FIG. 3). When the female connector 40 is inserted, the male connector terminal 33 and a female connector terminal (not shown) of the female connector 40 are connected electrically.

Figure 3:
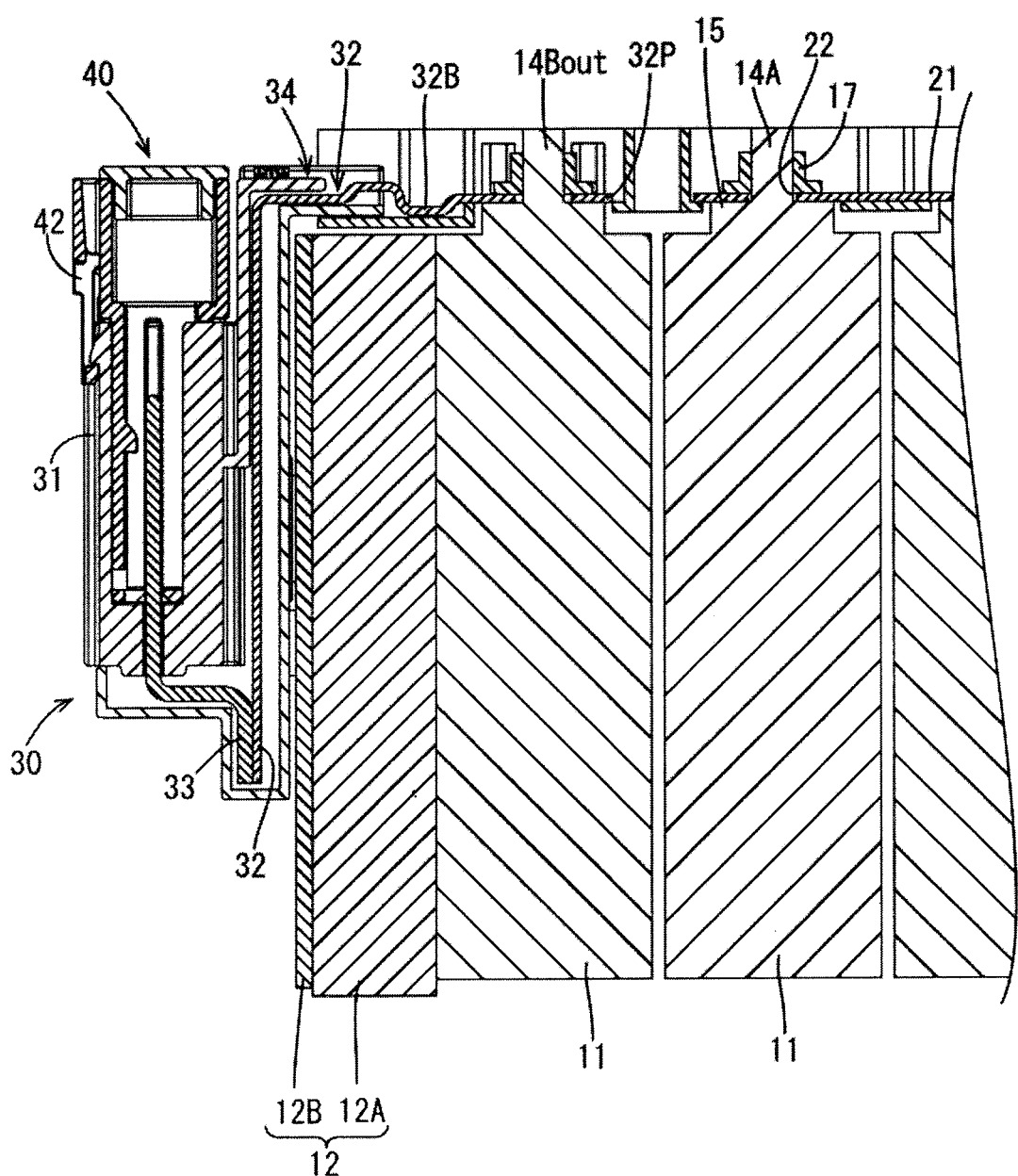
FIG. 3 is a schematic partial cross-sectional view taken along line A-A in FIG. 2.

The external connection bus bar 32 is bent to have an L-like shape (see FIG. 3), and is formed of metal such as copper, copper alloy, stainless steel (SUS), or aluminum like the bus bar 21. The external connection bus bar 32 includes an insertion hole 32A, a flexible part 32B, and the flat plate part 32P as illustrated in FIG. 3. A lower end part of the external connection bus bar 32 is bonded to an end of the male connector terminal 33 as illustrated in FIG. 4.

The insertion hole 32A is provided to the flat plate part 32P of the external connection bus bar 32, and has an oval opening shape (planar shape) that is long in the direction where the power storage elements 11 are arranged (arrow-X direction in FIG. 1). When the external connection bus bar 32 inserted to the external connection negative electrode terminal 14Bout through the insertion hole 32A is in contact with the terminal board 15, the external connection bus bar 32 and the external connection negative electrode terminal 14Bout are in electric connection. Here, since the insertion hole 32A has the oval shape, the product tolerance of the power storage elements 11 and the like in the direction where the power storage elements are arranged (arrow-X direction in FIG. 1) can be absorbed when the external connection bus bar 32 is connected to the external connection negative electrode terminal (external connection electrode terminal) 14Bout. Note that the opening shape of the insertion hole 32A is not limited to the oval shape and may be a circular shape, for example.

The flexible part 32B is formed by deforming the external connection bus bar 32 with a thin plate shape into a wave-like shape (see FIG. 4). The flexible part 32B is configured to expand and contract in the direction where the power storage elements are arranged (arrow-X direction in FIG. 1), and when the receiving connector 30 is fixed to the power storage element stack 10, the flexible part 32B expands and contracts to absorb the product tolerance of the power storage elements 11 and the like.

Figure 9:
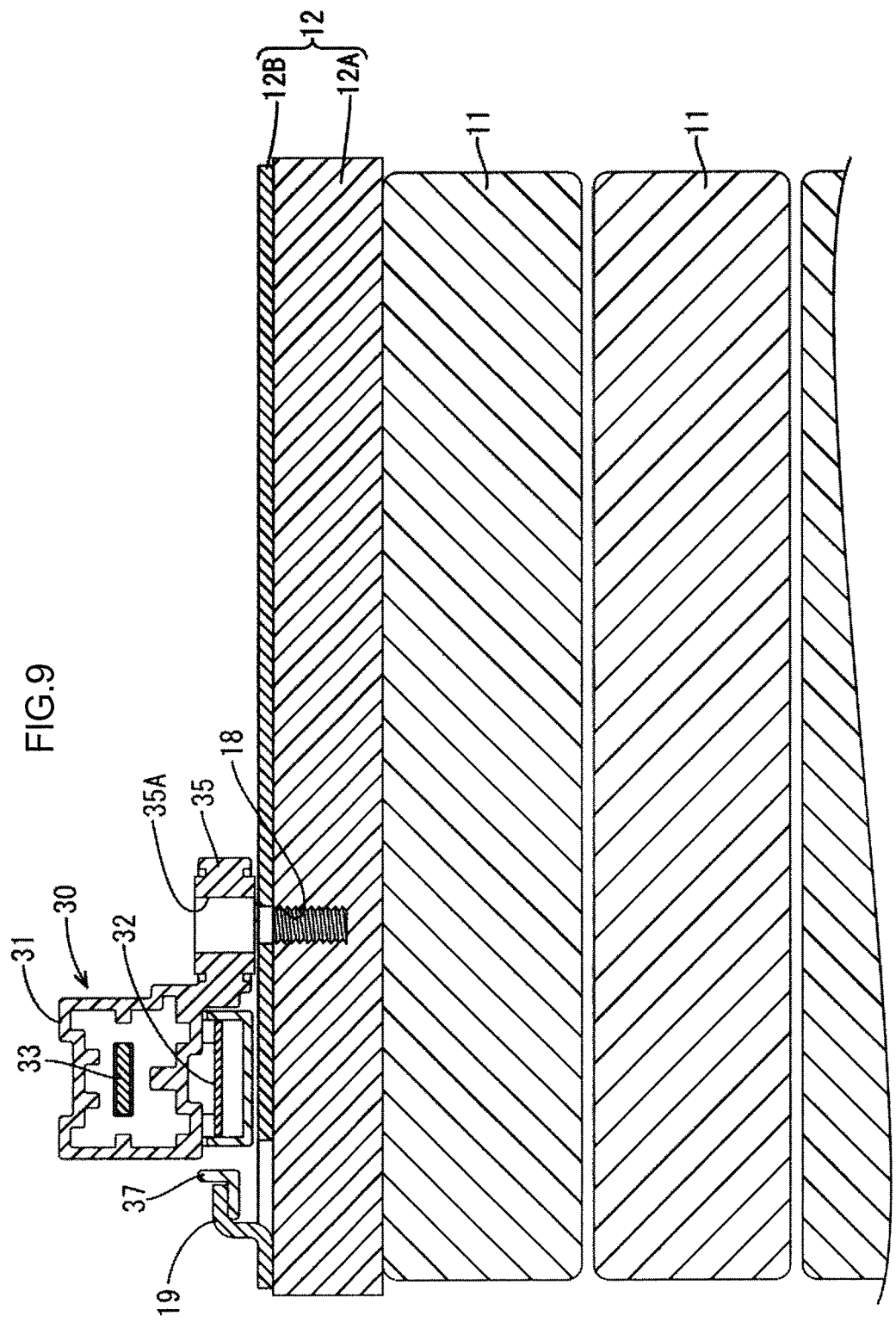
FIG. 9 is a partial cross-sectional view taken along line B-B in FIG. 8.
Figure 10:
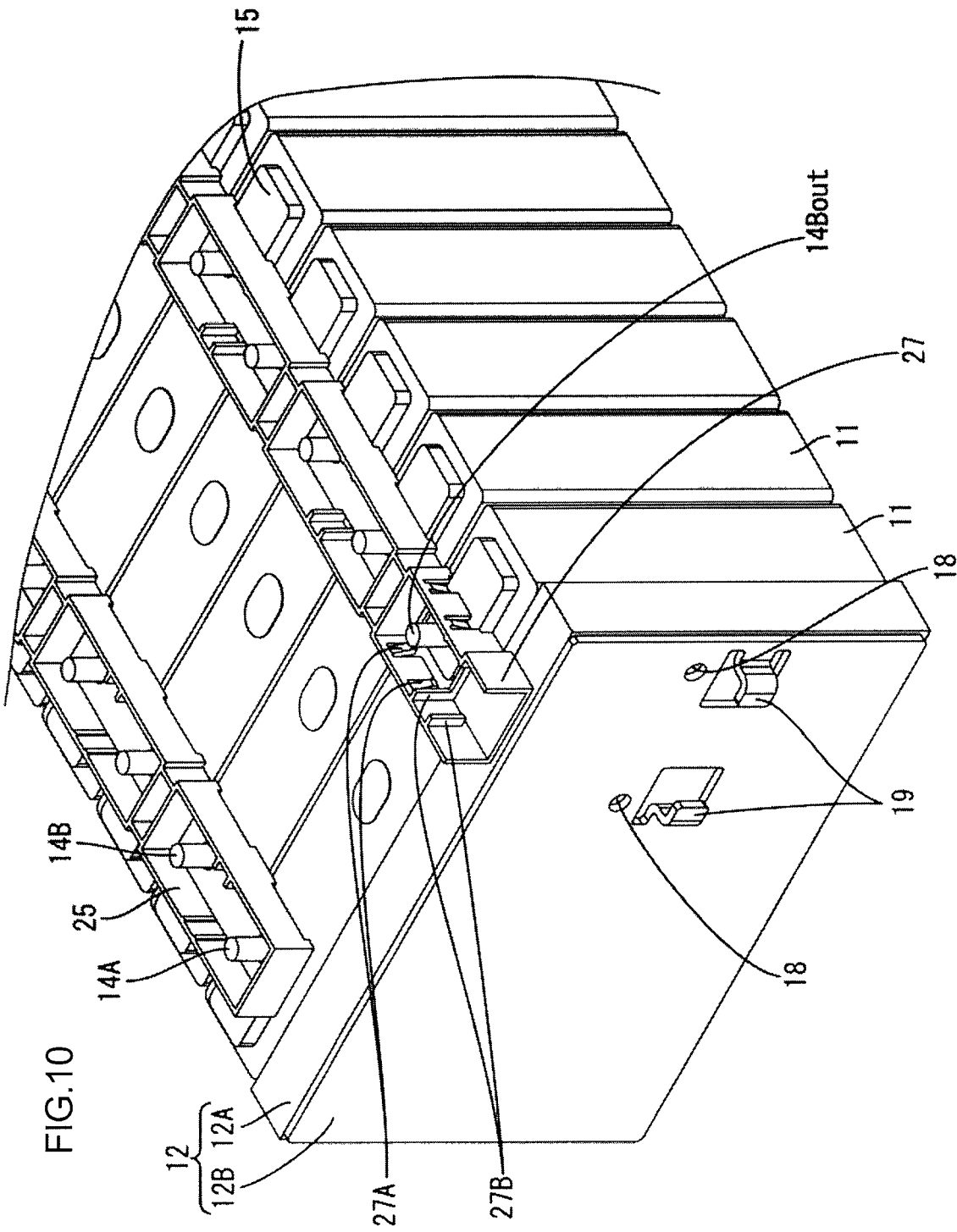
FIG. 10 is a partial perspective view for describing a connection method for an external connection bus bar.

The fixing parts 35 are provided as a pair (see FIG. 8), and each fixing part 35 is provided with a bolt penetration hole 35A into which a bolt 38 (see FIG. 2, etc.) can be inserted. Here, the bolt penetration hole 35A is larger in diameter than the screw hole 18 as illustrated in FIG. 9. Therefore, when the receiving connector 30 is fixed to the stack fixing member 12 with the bolt 38, the fixing position can be set flexibly. Thus, for example, backlash of the receiving connector 30 that is due to the product tolerance in fixing the receiving connector 30 can be absorbed. The configuration is not limited thereto. In another example, the bolt penetration hole 35A and the screw hole 18 may have the same diameter.

With the engaging claw 36, an engaging part 42 of the female connector 40 is engaged (see FIG. 3). The engaging parts 37 are provided as a pair (see FIG. 8), and each engaging part 37 is, when temporarily fixing the receiving connector 30, hooked by the engaging piece 19 of the second fixing member 12B. Thus, the receiving connector 30 is temporarily fixed.

4. Connection Structure for External Connection Bus Bar

Next, description is made of the connection structure 50 for an external connection bus bar, which corresponds to a structure of connecting the external connection bus bar 32 to the external connection negative electrode terminal 14Bout of the power storage element stack 10.

Figure 6:
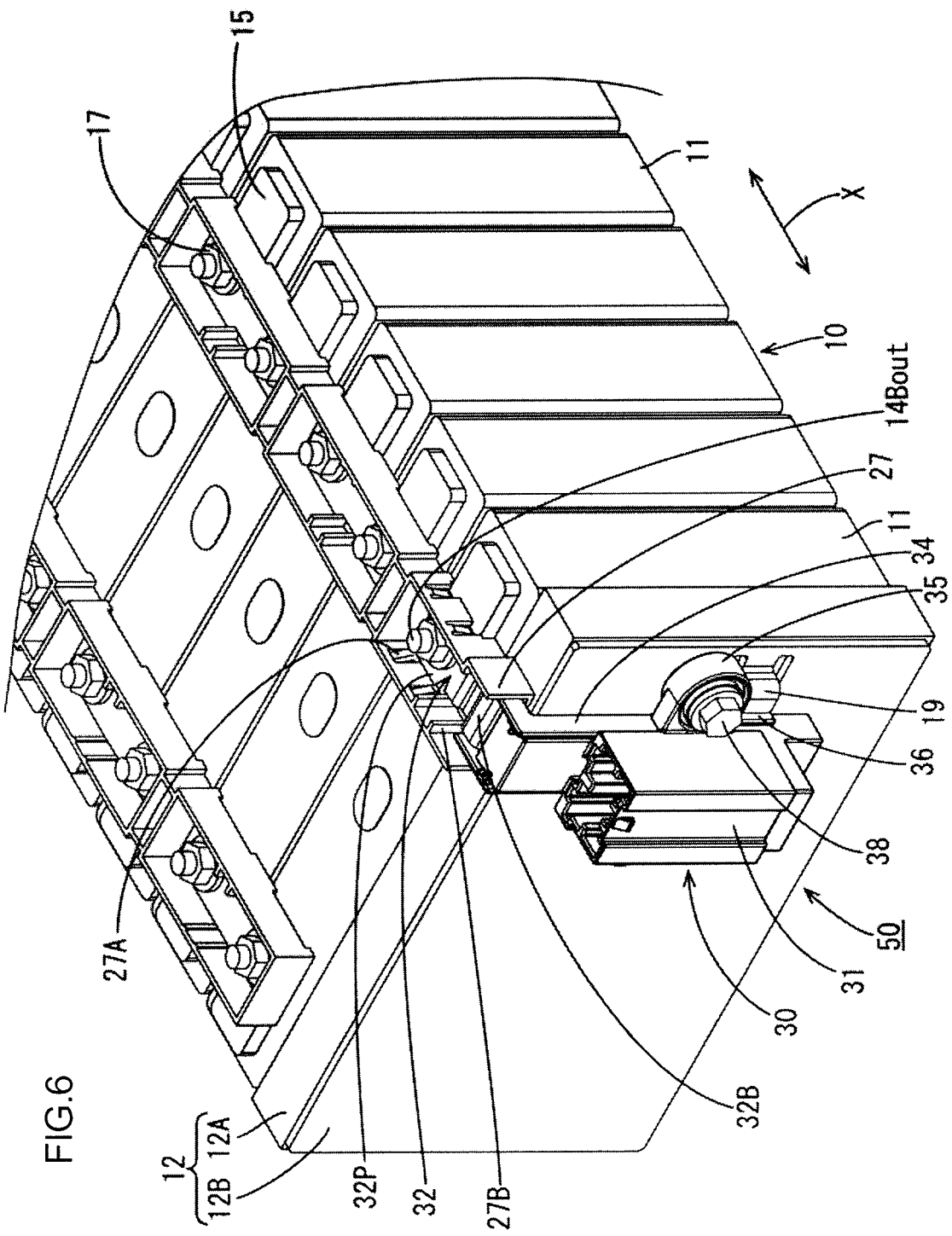
FIG. 6 is a partial perspective view illustrating a connection structure for an external connection bus bar.
Figure 7:
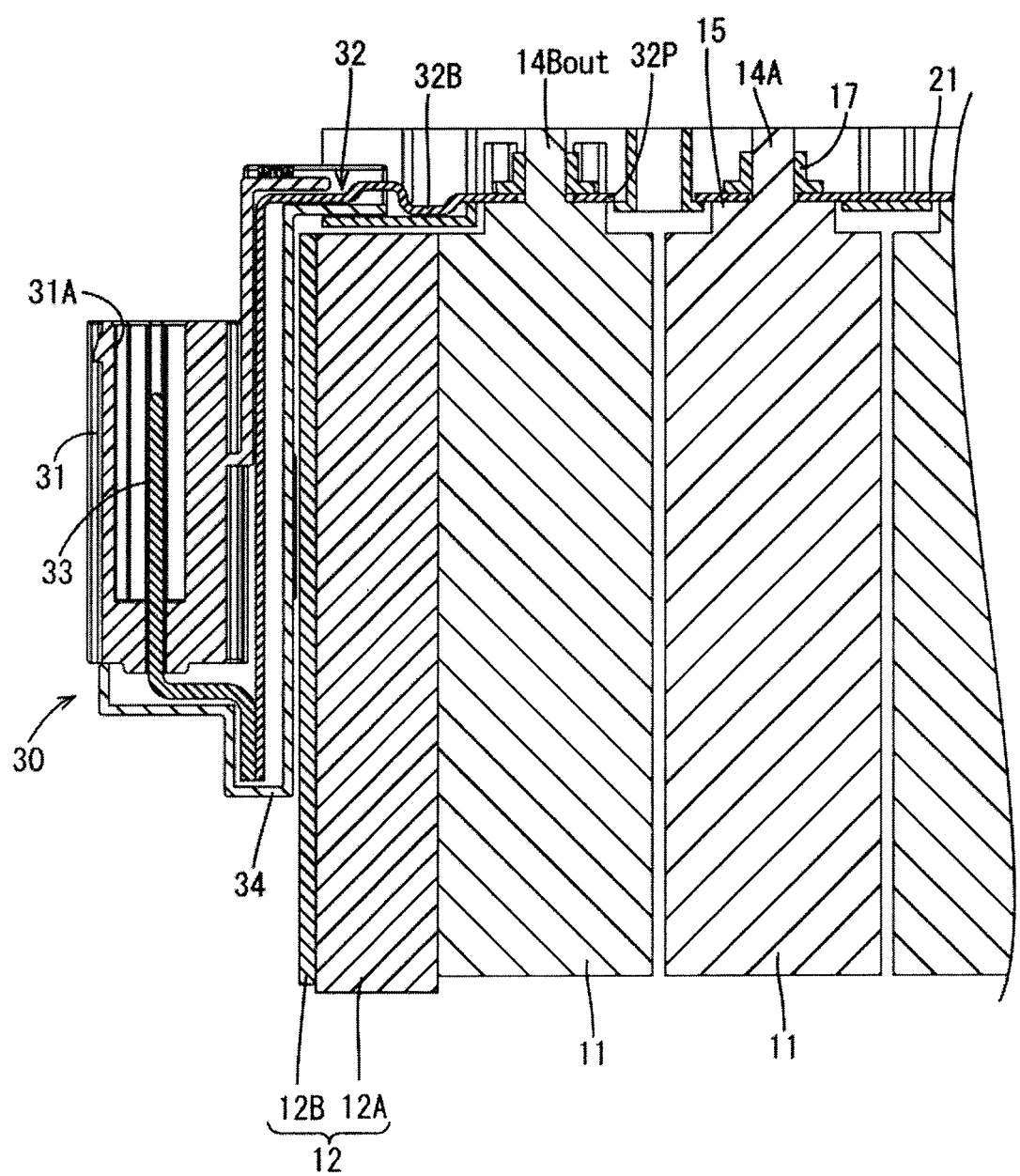
FIG. 7 is a schematic partial cross-sectional view of FIG. 3 excluding a female connector.
Figure 8:
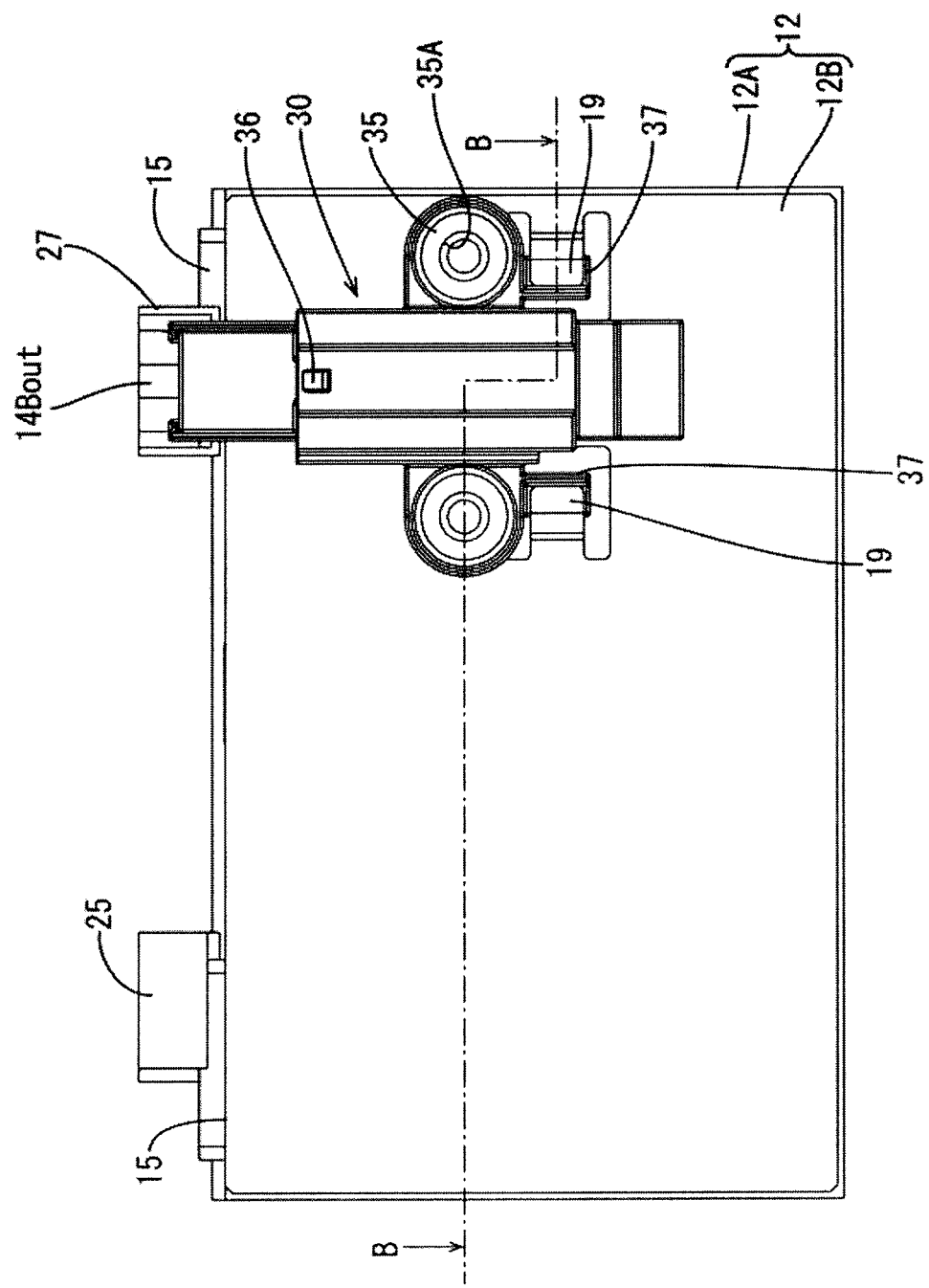
FIG. 8 is a side view of the power storage module.

The connection structure 50 for an external connection bus bar is formed by some of the components of the power storage module M1 that are: the external connection negative electrode terminal 14Bout of the power storage element stack 10, the external connection bus bar protector 27 of the connection module 20, the receiving connector 30, the external connection bus bar 32, the stack fixing member 12, a bolt 39, and the like as illustrated in FIG. 6.

5. Connection Method for External Connection Bus Bar

Next, description is made of a method of connecting the external connection bus bar 32 to the external connection negative electrode terminal 14Bout with reference to FIG. 6, and FIG. 10 to FIG. 12.

The connection method for an external connection bus bar broadly includes a bus bar connecting step of connecting the external connection bus bar 32 to the external connection negative electrode terminal 14Bout in a state where the external connection bus bar 32 is housed in the receiving connector 30, and a connector fixing step of fixing the receiving connector 30 to the power storage element stack 10 using the expansion and contraction of the flexible part 32B.

In accordance with this method, the external connection bus bar 32 is connected to the outside, such as a connection cable 45, through the male connector terminal 33 of the receiving connector 30 that is fixed to the power storage element stack 10 (specifically, stack fixing member 12) (see FIG. 2). Therefore, as compared to a case in which the connection cable 45 is directly connected to the external connection bus bar 32, a part of vibration from the vehicle that is applied to the connection part between the external connection bus bar 32 and the external connection negative electrode terminal 14Bout is absorbed by the receiving connector 30, and thus, the vibration from the vehicle is reduced.

In addition, when the receiving connector 30 is fixed to the stack fixing member 12, the tolerance between the power storage element 11 and the first fixing member 12A that is caused by the product tolerance of the power storage element 11 can be absorbed by the flexible part 32B of the external connection bus bar 32. Accordingly, the stress is applied less to the connection part. By reducing the vibration from the vehicle and the stress on the connection part between the external connection bus bar 32 and the external connection negative electrode terminal 14Bout in this manner, the reliability of the connection between the external connection bus bar 32 and the external connection negative electrode terminal 14Bout of the power storage element can be increased.

In the connection method for an external connection bus bar, the bus bar connecting step may further include: a connector temporarily fixing step of causing the prepared external connection bus bar protector 27 to hold the flat plate part (one end part) 32P of the external connection bus bar and temporarily fixing the receiving connector 30 to the stack fixing member 12 of the power storage element stack to temporarily position the receiving connector in the direction where the power storage elements are arranged (arrow-X direction in FIG. 1); a bus bar positioning step of positioning the flat plate part 32P of the external connection bus bar in a width direction (arrow-Y direction in FIG. 1) and a vertical direction (arrow-Z direction in FIG. 1) using the positioning parts (27A, 27B); and a bus bar connecting step of connecting the flat plate part 32P of the external connection bus bar to the external connection negative electrode terminal 14Bout. In this case, the connector fixing step may include a connector positioning step of, when the receiving connector 30 is fixed to the stack fixing member 12, positioning the receiving connector in the direction where the power storage elements are arranged (arrow-X direction in FIG. 1) by using the expansion and contraction of the flexible part 32B of the external connection bus bar 32.

In this case, while the receiving connector 30 is temporarily fixed, the external connection bus bar 32 is positioned and then connected to the external connection negative electrode terminal 14Bout (external connection electrode terminal); therefore, the external connection bus bar 32 and the external connection negative electrode terminal 14Bout can be connected correctly at a predetermined place. In addition, the receiving connector 30 can be fixed at a desired position while the backlash due to the product tolerance is absorbed using the expansion and contraction of the flexible part 32B of the external connection bus bar.

In the connection method for an external connection bus bar, more specifically, in a state where the connection module 20 is attached to the upper surface of the power storage element stack 10 (see FIG. 10), first, the external connection negative electrode terminal 14Bout is inserted into the insertion hole 32A of the external connection bus bar 32 housed in the receiving connector 30. In this insertion, the positioning claw 27A is displaced with the flat plate part 32P of the external connection bus bar 32 in contact with the positioning claw 27A. Thus, the flat plate part 32P of the external connection bus bar 32 is placed on the terminal board 15 below the positioning claw 27A.

Figure 11:
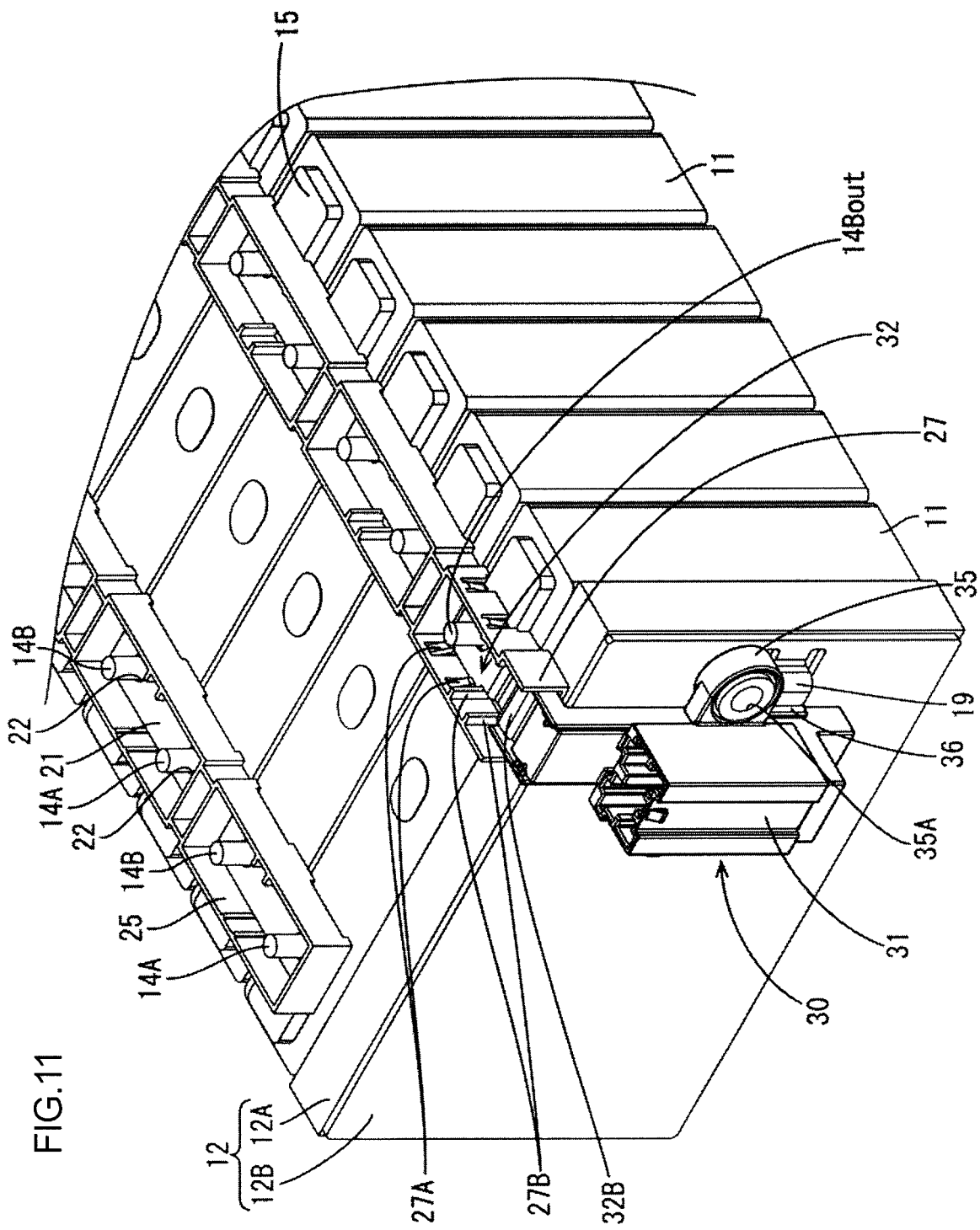
FIG. 11 is a partial perspective view for describing the connection method for an external connection bus bar.

In the bus bar positioning step, a cutoff part 32K of the external connection bus bar 32 or the like is brought into contact with the positioning rib 27B. A pair of engaging parts 37 of the receiving connector 30 is hooked by a pair of engaging pieces 19 of the second fixing member 12B. Here, the position of the receiving connector 30 in the direction where the power storage elements are arranged (arrow-X direction in FIG. 1) is temporarily determined. Thus, the connector temporarily fixing step of temporarily fixing the receiving connector 30 to the power storage element stack 10 (specifically, second fixing member 12B) so as to temporarily position the receiving connector 30 in the direction where the power storage elements are arranged (arrow-X direction in FIG. 1) is completed. FIG. 11 illustrates a state where the receiving connector 30 is temporarily fixed.

Next, in the state where the receiving connector 30 is temporarily fixed, the bus bar 21 is bonded to the terminal board 15 by fastening the electrode terminal 14 of each power storage element 11 of the power storage element stack 10 with the nut 17 and moreover the external connection bus bar 32 is bonded to the terminal board 15 by fastening the external connection negative electrode terminal 14Bout with the nut 17. Thus, the external connection bus bar 32 is positioned in the vertical direction (arrow-Z direction in FIG. 1) and in the width direction (arrow-Y direction in FIG. 1) (bus bar positioning step).

Figure 12:
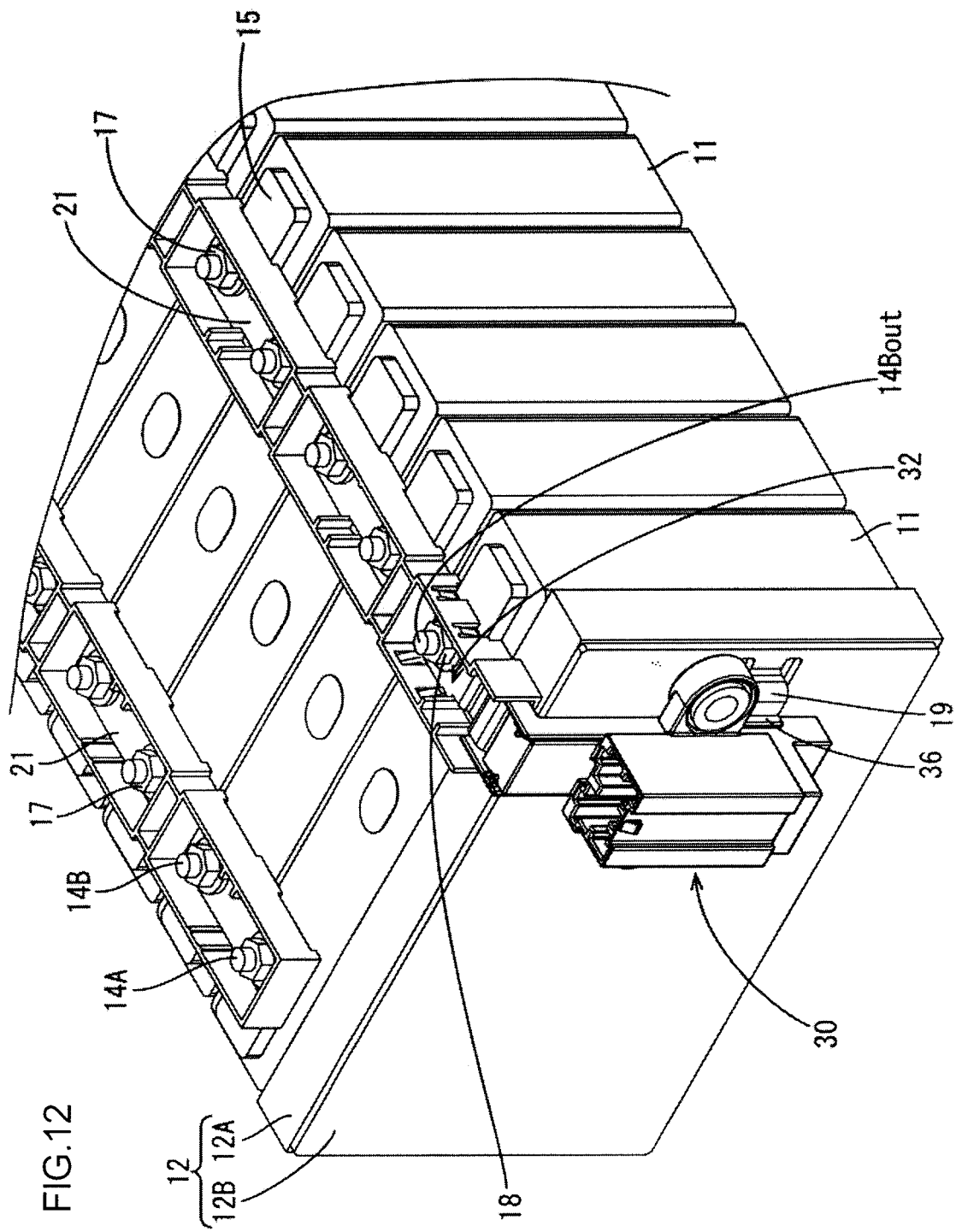
FIG. 12 is a partial perspective view for describing the connection method for an external connection bus bar.

Here, the insertion hole 32A of the external connection bus bar 32 is a long hole that is long in the direction where the power storage elements are arranged (arrow-X direction in FIG. 1). The product tolerance of the power storage elements 11 and the like in the state where the receiving connector 30 is fixed by the second fixing member 12B is absorbed and the external connection bus bar 32 is fixed. This state is shown in FIG. 12. In this state, the bolt penetration hole 35A communicates with the screw hole 18 (see FIG. 9).

Next, as illustrated in FIG. 6, the bolt 39 is inserted into the bolt penetration hole 35A of the fixing part 35 of the receiving connector, and the bolt 39 is screwed into the screw hole 18 of the stack fixing member 12. Thus, the receiving connector 30 is fixed to the power storage element stack 10 through the stack fixing member 12 (connector fixing step). In this case, due to the difference in position from the temporary fixing, stress is generated in the direction where the power storage elements are arranged (arrow-X direction in FIG. 1) and the stress is applied to the connection part between the external connection bus bar 32 and the terminal board 15. This stress, however, is absorbed by the expansion and contraction of the flexible part 32B of the external connection bus bar 32.

The order of steps in the connection method is not limited to the order described above, and for example, the bus bar positioning step and the connector positioning step may be opposite. That is to say, the connector fixing step may be performed before the bus bar positioning step.

6. Effects of the Present Embodiment

The external connection bus bar 32 is connected to the connection cable (external connection member) 45 through the male connector terminal 33 of the receiving connector 30 fixed to the stack fixing member 12. Therefore, as compared to the case in which the connection cable 45 is directly connected to the external connection bus bar 32, apart of the vibration from the vehicle that is applied to the connection part between the external connection bus bar 32 and the external connection negative electrode terminal (external connection electrode terminal) 14Bout is absorbed by the receiving connector 30, and the vibration from the vehicle that is applied to the connection part is reduced.

When the receiving connector 30 is fixed to the stack fixing member 12, the flexible part 32B of the external connection bus bar can absorb the tolerance between the power storage element 11 and the stack fixing member 12 that is caused by the product tolerance of the power storage element 11. Thus, the stress on the connection part can be reduced. By reducing the vibration from the vehicle and the stress on the connection part between the external connection bus bar 32 and the external connection negative electrode terminal 14Bout in this manner, the reliability of the connection between the external connection bus bar 32 and the external connection negative electrode terminal 14Bout of the power storage element 11 can be increased.

In this case, in the structure in which the external connection bus bar 32 is connected by bolt fastening to the external connection negative electrode terminal (external connection electrode terminal) 14Bout, the reliability of the connection between the external connection bus bar 32 and the external connection negative electrode terminal 14Bout against the vibration from the vehicle can be increased.

OTHER EMBODIMENTS

The technology described herein is not limited to the embodiment described above and with reference to the drawings. The following embodiments may be included in the technical scope.

(1) In the above embodiment, the external connection negative electrode terminal 14Bout is the cylindrical terminal (bolt terminal) and the external connection bus bar 32 is bonded to the external connection negative electrode terminal 14Bout with the nut 17; however, the structure is not limited to this example. In another example, the external connection negative electrode terminal 14Bout may be a plate-shaped electrode, and the external connection bus bar 32 may be welded with a laser to the plate-shaped electrode. That is to say, the present application is also employed in a configuration in which the external connection bus bar is welded with a laser to the plate-shaped electrode.

(2) In regard to the connection configuration (connection structure) of the external connection bus bar 32, the external connection bus bar 32 is connected to the external connection negative electrode terminal 14Bout in the above embodiment; however, the structure is not limited to this example. That is to say, the present application is also employed in a configuration in which the external connection bus bar 32 is connected to the external connection positive electrode terminal 14Aout, or a configuration in which the external connection bus bar 32 is connected to the external connection positive electrode terminal 14Aout and the external connection negative electrode terminal 14Bout.

The invention claimed is:

1. A connection structure for an external connection bus bar configured to connect the external connection bus bar to an external connection electrode terminal of a power storage element stack formed by arranging a plurality of power storage elements including electrode terminals of a positive electrode and a negative electrode, the connection structure comprising:
the external connection bus bar including one end part to be connected to the external connection electrode terminal;
a receiving connector that houses the external connection bus bar and is fixed to the power storage element stack, and that includes a connector terminal to be connected to the external connection bus bar and to connect the external connection bus bar to an outside; and
a fixing member that is provided to one end of the power storage element stack and fixes the receiving connector,
wherein the external connection bus bar includes a flexible part that is configured to expand and contract in a direction where the power storage elements are arranged.

2. The connection structure for the external connection bus bar according to claim 1, wherein:
the external connection electrode terminal includes a bolt terminal;
the external connection bus bar includes an insertion hole at the one end part, the insertion hole into which the bolt terminal is inserted; and
the insertion hole has an oval shape that is long in the direction where the power storage elements are arranged.

3. The connection structure for the external connection bus bar according to claim 1, wherein:
the fixing member includes a fixing hole configured to fix the receiving connector;
the receiving connector includes a penetration hole communicating with the fixing hole, the penetration hole allowing a bolt that is to be fitted to the fixing hole to pass therethrough; and
the penetration hole is larger in diameter than the fixing hole.

4. The connection structure for the external connection bus bar according to claim 1, further comprising an external connection bus bar protector that holds the one end part of the external connection bus bar,
wherein the external connection bus bar protector includes:
a first positioning part that positions the external connection bus bar in a vertical direction; and
a second positioning part that positions the external connection bus bar in a width direction.

5. A connection method for an external connection bus bar configured to connect the external connection bus bar to an external connection electrode terminal of a power storage element stack formed by arranging a plurality of power storage elements including electrode terminals of a positive electrode and a negative electrode, the connection method comprising:
preparing
the external connection bus bar that includes one end part to be connected to the external connection electrode terminal and includes a flexible part that is configured to expand and contract in a direction where the power storage elements are arranged, and
a receiving connector that houses the external connection bus bar and is fixed to the power storage element stack and that includes a connector terminal to be connected to the external connection bus bar and to connect the external connection bus bar to an outside;
connecting the external connection bus bar to the external connection electrode terminal in a state where the external connection bus bar is housed in the receiving connector; and
fixing the receiving connector to the power storage element stack by using expansion and contraction of the flexible part.

6. The connection method for the external connection bus bar according to claim 5, further comprising preparing an external connection bus bar protector that holds the one end part of the external connection bus bar and includes a positioning part that positions the external connection bus bar, connecting the external connection bus bar to the external connection electrode terminal further comprising:

causing the external connection bus bar protector to hold the one end part of the external connection bus bar and temporarily fixing the receiving connector to the fixing member of the power storage element stack to temporarily position the receiving connector in the direction where the power storage elements are arranged;

positioning the one end part of the external connection bus bar in a width direction and a vertical direction using the positioning part; and connecting the one end part of the external connection bus bar to the external connection electrode terminal, and fixing the receiving connector to the power storage element stack further comprising when the receiving connector is fixed to the fixing member, positioning the receiving connector in the direction where the power storage elements are arranged by using the expansion and contraction of the flexible part of the external connection bus bar.

* * * * *